US008769033B2

(12) United States Patent
Manders

(10) Patent No.: US 8,769,033 B2
(45) Date of Patent: Jul. 1, 2014

(54) IDENTIFYING CHANGES TO MEDIA-DEVICE CONTENTS

(75) Inventor: Blake D. Manders, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1774 days.

(21) Appl. No.: 11/368,145

(22) Filed: Mar. 3, 2006

(65) Prior Publication Data

US 2007/0208818 A1    Sep. 6, 2007

(51) Int. Cl.
*G06F 15/16* (2006.01)

(52) U.S. Cl.
USPC .......................................... 709/208; 709/221

(58) Field of Classification Search
USPC .................................................. 709/208, 221
See application file for complete search history.

(56) References Cited

U.S. PATENT DOCUMENTS

| 5,661,665 | A  |   | 8/1997  | Glass et al.      |         |
|-----------|----|---|---------|-------------------|---------|
| 5,710,922 | A  |   | 1/1998  | Alley et al.      |         |
| 5,966,714 | A  | * | 10/1999 | Huang et al.      | 707/201 |
| 5,974,238 | A  | * | 10/1999 | Chase, Jr.        | 709/248 |
| 6,052,735 | A  | * | 4/2000  | Ulrich et al.     | 709/236 |
| 6,449,622 | B1 | * | 9/2002  | LaRue et al.      | 707/201 |
| 6,671,757 | B1 | * | 12/2003 | Multer et al.     | 710/100 |
| 6,694,335 | B1 | * | 2/2004  | Hopmann et al.    | 707/201 |
| 6,732,144 | B1 | * | 5/2004  | Kizu et al.       | 709/203 |
| 6,832,373 | B2 |   | 12/2004 | O'Neill           |         |
| 6,882,993 | B1 | * | 4/2005  | Lawande et al.    | 707/714 |
| 6,928,467 | B2 | * | 8/2005  | Peng              | 709/219 |
| 6,931,454 | B2 | * | 8/2005  | Deshpande et al.  | 709/248 |
| 6,996,818 | B2 |   | 2/2006  | Jacobi et al.     |         |
| 7,032,033 | B1 | * | 4/2006  | Ledoux et al.     | 709/248 |
| 7,149,813 | B2 | * | 12/2006 | Flanagin et al.   | 709/248 |
| 7,243,163 | B1 | * | 7/2007  | Friend et al.     | 709/248 |
| 7,539,889 | B2 | * | 5/2009  | Celinski et al.   | 713/400 |
| 7,610,387 | B1 | * | 10/2009 | Liskov et al.     | 709/227 |

(Continued)

FOREIGN PATENT DOCUMENTS

| JP | H10-63557 A   | 3/1998  |
|----|---------------|---------|
| JP | 2001306376 A  | 11/2001 |

(Continued)

OTHER PUBLICATIONS

D. Chmielewski and G. Hu, "A Distributed Platform for Archiving and Retrieving RSS Feeds", Proceedings of the Fourth Annual ACIS International Conference on Computer and Information Science, Jul. 14-16, 2005, pp. 215-220.

(Continued)

*Primary Examiner* — Azizul Choudhury
*Assistant Examiner* — Tariq Najee-Ullah
(74) *Attorney, Agent, or Firm* — Carole Boelitz; Peter Taylor; Micky Minhas

(57) ABSTRACT

A method to expose information about a set of data objects to a master device is provided. A benchmark sequence indicator is used in connection with a set of sequence indicators that are each related to data objects (such as media files on a device) to satisfy multiple independent requests for information about certain objects that satisfy sequence criteria conveyed from multiple requesting applications. An embodied data structure includes a set of properties associated with a data object as well as a sequence-identification field that also corresponds to the data object and that is populated with an object sequence indicator that indicates when a change occurred to the data object.

11 Claims, 9 Drawing Sheets

(56) References Cited

U.S. PATENT DOCUMENTS

| | | | |
|---|---|---|---|
| 8,209,537 B2* | 6/2012 | Roeder et al. | 713/171 |
| 8,537,404 B2* | 9/2013 | Berglin | 358/1.15 |
| 2001/0041021 A1 | 11/2001 | Boyle et al. | |
| 2001/0048728 A1* | 12/2001 | Peng | 375/354 |
| 2002/0073236 A1* | 6/2002 | Helgeson et al. | 709/246 |
| 2003/0046434 A1* | 3/2003 | Flanagin et al. | 709/248 |
| 2003/0050046 A1* | 3/2003 | Conneely et al. | 455/412 |
| 2003/0112849 A1* | 6/2003 | Gorday et al. | 375/130 |
| 2004/0024795 A1* | 2/2004 | Hind et al. | 707/204 |
| 2004/0058710 A1* | 3/2004 | Timmins et al. | 455/560 |
| 2005/0198084 A1* | 9/2005 | Kim | 707/204 |
| 2005/0203905 A1* | 9/2005 | Jung et al. | 707/8 |
| 2005/0223229 A1* | 10/2005 | Roeder et al. | 713/171 |
| 2006/0003806 A1 | 1/2006 | Weber et al. | |
| 2007/0226530 A1* | 9/2007 | Celinski et al. | 713/500 |
| 2008/0049691 A1* | 2/2008 | Pulikonda | 370/338 |

FOREIGN PATENT DOCUMENTS

| | | |
|---|---|---|
| KR | 10-2001-0036488 | 5/2001 |
| KR | 10-2002-0003674 | 1/2002 |
| TW | 373151 | 11/1999 |
| WO | 03/083667 A1 | 10/2003 |

OTHER PUBLICATIONS

"Isync: Free IMAP and MailDir Mailbox Synchronizer", http://isync.sourceforge.net/.

Rosoff, Matt, "Media Player Update Moves Strategy Forward", http://www.directionsonmicrosoft.com/sample/DOMIS/update/2004/10oct/1004mpumsf.htm, Sep. 6, 2004.

"What is MTP? (Sidebar)", http://www.directionsonmicrosoft.com/sample/DOMIS/update/2004/10oct/1004mpumsf_sb.htm, Sep. 6, 2004.

"PDASync," http://www.laplink.com/products/PDAsync/overview.asp.

"SyncML Intensive", http://www-128.ibm.com/developerworks/library/wi-syncm12/, Apr. 1, 2002.

English Translation of Korean Office Action mailed Nov. 29, 2013 in Application No. 10-2008-7021621.

* cited by examiner

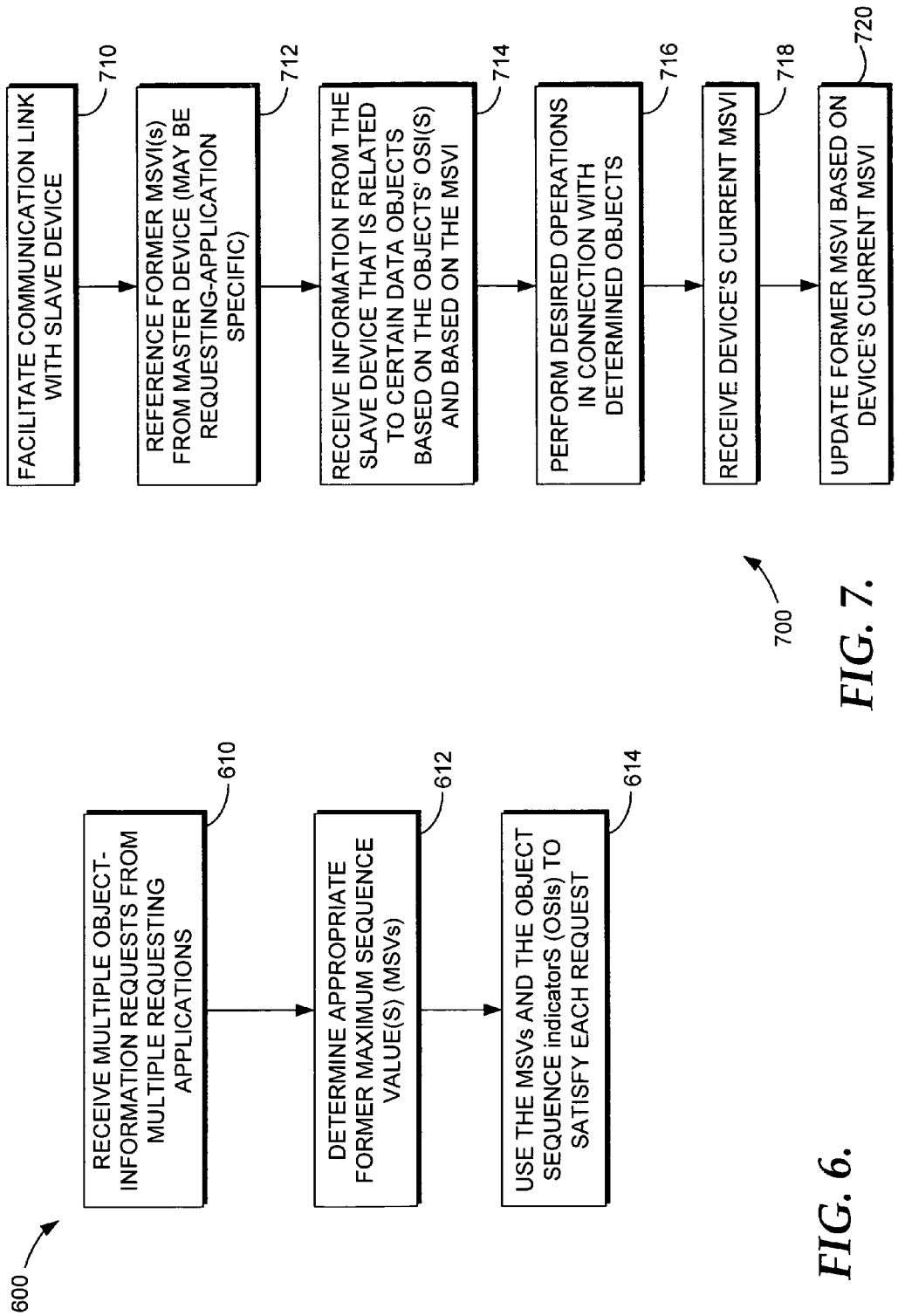

IDENTIFYING CHANGES TO MEDIA-DEVICE CONTENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Digital cameras, personal media players, mobile phones, and other devices continue to become increasingly popular worldwide. Users take pictures, listen to music, watch videos, etc., and often share data between the devices and other devices such as a computer. For instance, music files can be downloaded first to a computer and then transferred to a portable music player. Digital pictures can be taken and then transferred to a computing device. An overarching issue that persists is identifying changes to data of a given device in an efficient manner and in ways that are desirable to a user.

Consider two illustrative examples: the digital camera and the digital music player. In the case of the digital camera, a user may snap tens or hundreds of pictures but desire to upload only a portion to a computer, after having already uploaded a previous set of pictures. Or in the case of a portable music player, its content may be manipulated, and whatever changes occur may be desired to be replicated on a computer. At least two circumstances are exacerbating the problem: large increases in storage capacity of electronic devices, and the need for one device to communicate with many initiating applications.

Portable music players, and other devices, routinely store gigabytes of information, and storage capacities will undoubtedly continue to rise. Historically, storage capacity has grown quadratically while transfer speed has grown linearly. Conveying information about tens of gigabytes of data stored on an electronic device is significantly more difficult than information about a few megabytes of data. Currently, one way this is handled is to interrogate an electronic device to determine a complete mapping of its components, and then let a requesting application determine how to manage the device's content. In such a paradigm, no relationship is assumed to exist between the device and the PC. The PC learns of information on the connecting device by downloading the content from the device.

Although technologies have attempted to leverage increasing transfer speed of data between the device and the computer, merely increasing transfer speed is not an adequate solution for a variety of reasons. First, needlessly sending tens of gigabytes of information to a PC is inherently wasteful. Secondly, a user is made to wait longer than is necessary if an adequate alternative exists. And most significantly, multiple applications compete for access to the content on a coupled device. For example, multiple audio-file applications will attempt to establish a communications link with a portable audio player as soon as the player is coupled to a computer. If each player acts independently, then each player has to download all of the information on the coupled device in order to learn about the content on the coupled device.

In some settings, a one-to-one relationship exists between a computer and an electronic device. This makes things easier but has clear shortfalls. For example, some media-playing applications are designed to work only with a certain brand of media-playing device. In this scenario, a relationship can be assumed to exist between the computing device and the electronic device. This makes available an option for synchronizing databases. A database exists on the computing device and a database also exists on the electronic device. When changes occur to either database, provisions are made to replicate whatever changes are made to one, to the other, and vice versa. But this paradigm is unworkable when two or more applications on the computing device attempt to communicate information about data on a coupled electronic device. This formidable and well-known problem is known as the multi-master synchronization problem. Again, synchronizing databases that store gigabytes, and in time terabytes, or information is resource intensive and, as will be shown, is unnecessary.

Summarily, the two major ways to synchronize data between a computing device and an electronic device are to either mirror databases on each device, or to receive a complete mapping of all content on an electronic device coupled to a computing device. Neither of these ways offers an efficient way to learn about the content of a device quickly and efficiently without having to actually transfer all of the media content of the device. For example, after leaving several hundred pictures on a digital camera, a user may snap just a few additional pictures and reconnect the camera to a computing device. Neither of these methods presents a universal way to receive an indication that only the few recent pictures are new and to provide a computing device with the ability to present options to a user to manipulate the changed content. These sorts of problems are pervasive with respect to a variety of devices, such as mobile phones, PDAs, portable media players, and the like.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

This disclosure describes methods and data structures to efficiently receive and present object information that relates to certain data objects on a media device, such as an electronic device. Data objects include items such as media files (audio, video, pictures, etc.). Object-oriented primitives (object metadata, device metadata, and operations) are used to expose only the information required to allow multiple requesting applications to perform synchronization-based interactions (selective enumeration, acquisition, placement, etc.) with the device. When a change occurs to an object, it receives a sequence indicator that can later be used to relationally determine when the change occurred. This method does not rely on any established partnership or shared information between the devices, such as synchronized clocks or change-logs. The invention has several practical applications in the technical arts including reducing the time and resources associated with identifying changed, new, and deleted content on various types of electronic devices.

BRIEF DESCRIPTION OF THE SEVERAL VIEWS OF THE DRAWINGS

Embodiments of the invention are described in detail below with reference to the attached drawing figures, which are incorporated by reference herein and wherein:

FIG. 6 is flow diagram that depicts one method of a slave device exposing its content to potentially many requesting applications in accordance with an embodiment of the invention;

FIG. 7 is a flow diagram depicting an illustrative method of an application receiving information about objects stored on a slave device in accordance with an embodiment of the invention.

DETAILED DESCRIPTION

Figure 1:
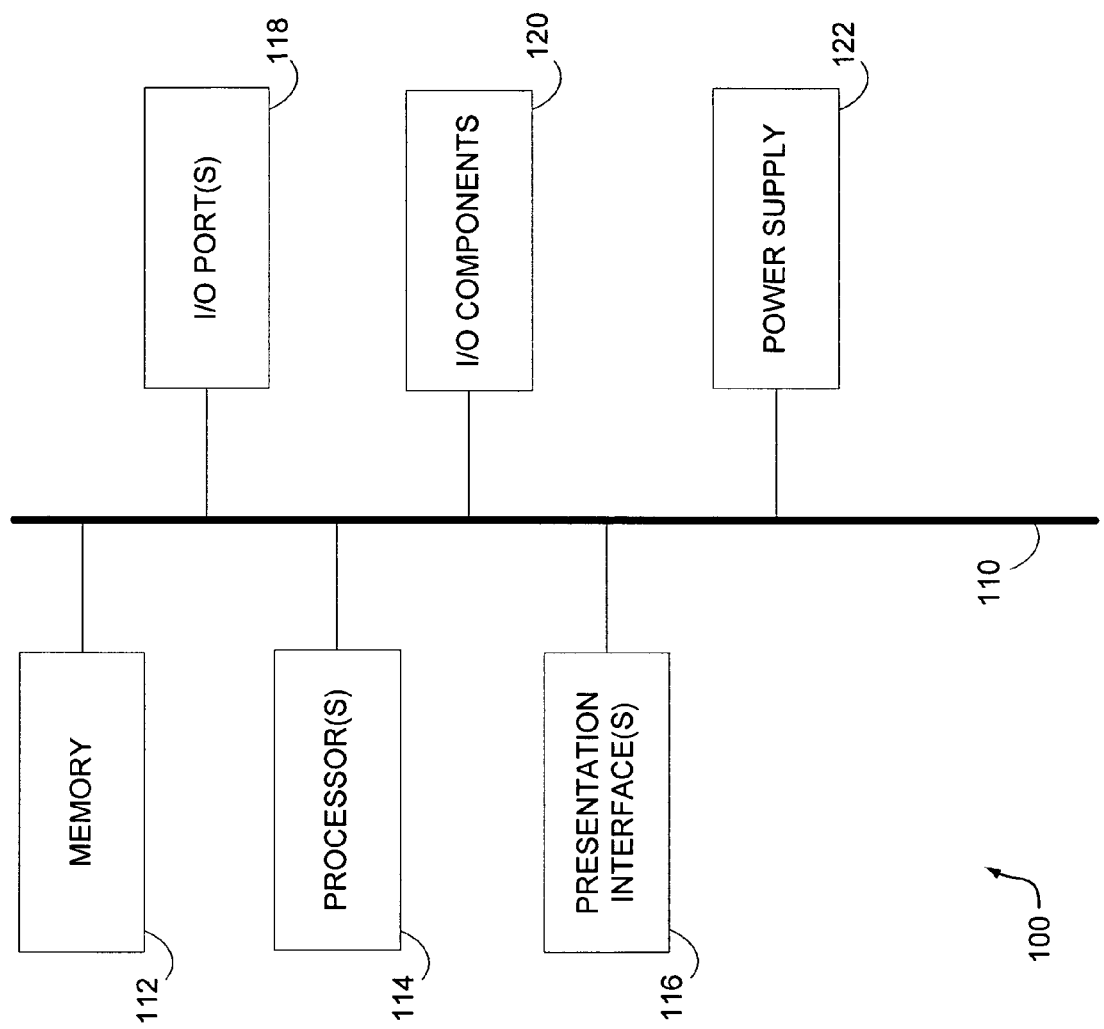
FIG. 1 is a block diagram of an illustrative initiating device suitable for operation in accordance with an embodiment of the invention.

Exact implementations of the technologies that will be described can vary without departing from the scope of the claims below. A property is provided that allows for the identification of a sequence in which objects were changed (including created and deleted) on a device, which is also associated with at least one property that allows for an identification of a current position in the sequence. Note, as used here "sequence," "sequential," and other variations are not intended to mean a continuous series or a set of contiguous values having a common difference. Rather, gaps are fully contemplated. Thus the set {1, 4, 897, 6987} would be values in a sequence as used herein. This permits a requesting device to be rapidly presented with information such as a list of handles to certain objects that fall within a desired range of the sequence (e.g., greater than some value).

Throughout the description of the invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the invention. The following is a list of these acronyms:

| Acronym | Phrase | Abridged explanation, but see specification for full |
|---------|--------|------------------------------------------------------|
| MSVI | Maximum-sequence-value indicator | An indicator from which the maximum-sequence-value of a set of values can be determined, can provide a basis to determine subsequent OSIs. Initially associated with a slave device, it indicates the largest object sequence indicator for a given set of objects on the device and is also received by a master device, which may track a current maximum-sequence-value indicator of device at current connection and/or a former maximum-sequence-value indicator of device at last-known connection. |
| OSI | Object sequence indicator | A property that designates when a change occurred to an object (including new and deleted objects) at least with respect to a maximum-sequence-value indicator, but in some embodiments with respect to changes of other objects |

Illustrative aspects of the invention will be described in greater detail below. Listing some aspects should not be construed as an indication that other aspects do not exist. But a select listing is provided for illustrative purposes.

In a first illustrative aspect, a computer program product is provided for causing a master device to perform a method for receiving object information that is related to a variety of objects on a slave device. In one embodiment, each of the objects on the slave device is associated with a monotonic sequence indicator. The method includes retrieving from the master device a former maximum-sequence-value indicator, which indicates when the slave device last communicated with the master device. Based on that former maximum-sequence-value indicator and on the object sequence indicators of the various objects, information can be received that is associated with a set of objects on the slave device that are new or that have changed since the slave device last communicated with the master device.

In a second illustrative aspect, an embodied data structure is provided for assisting in the presentation of information related to objects of an electronic device to another device. There was a data structure for each data object on the device. Also provided is a maximum-sequence-value indicator (MSVI) that is associated with the set of objects. The data structure includes a variety of properties that describe various aspects of the object, but also includes a sequence-identification field that is populated with an object sequence indicator (OSI) that indicates when a change occurred to the data object in relation to the maximum-sequence-value indicator. Creating new objects is included within the scope of "change."

In a third illustrative aspect, a method is provided for storing information that is associated with a set of data objects that are embodied on storage media that is associated with at least one MSVI. The method includes receiving multiple independent object-information requests from multiple respective requesting applications, where each request is for information about at least a portion of the data, identifying from each request a respective former MSVI that indicates when the slave device last communicated with a respective requesting application, and utilizing previously stored object sequence indicators in connection with the respective former maximum-sequence-value indicator to satisfy each of such request that each requesting application receives information about only those data objects whose corresponding object sequence indicator satisfies criteria with respect to the maximum-sequence-value indicator.

In a fourth illustrative aspect, a method is provided for identifying a sequence in which data objects were changed or created on a device. The method includes providing for the association with each of the data objects a sequence-position indicator that monotonically varies with respect to a set of previously assigned sequence-position indicators. The method further includes providing for the communication of a set of object references that corresponds to a set of objects that include newly created objects and objects for which at least one property has changed after a defined point.

In a final illustrative aspect, an embodiment takes the form of embodied instructions that facilitate an exchange of information between a slave device and a master device. Reception of a benchmark sequence-indicator is provided for that is associated with a set of one or more objects on the slave device. Each of the objects is respectively associated with a monotonic sequence-indicator. The determination of what objects are on the slave device is also provided for based on the benchmark indicator.

The invention may be described in the general context of computer code or machine-useable instructions, including computer-executable instructions, such as program modules, being executed by a computer or other machine, such as a personal data assistant or other handheld device. Generally, program modules including routines, programs, objects, components, data structures, protocols, etc., refer to code that performs particular tasks or implements particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Referring to FIG. 1 in particular, aspects of an exemplary master device 100 are provided. Master device 100 may be a computer or computing device, gaming console, stereo head unit, etc., and is but one example of a suitable operating environment. It is not intended to suggest any limitation as to the scope of use or functionality of the invention. Neither should there be an interpretation of any dependency or requirement relating to any one or combination of components illustrated.

With reference to FIG. 1, master device 100 includes a bus 110 that directly or indirectly couples the following devices: memory 112, one or more processors 114, one or more presentation interfaces 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be gray and fuzzy. For example, one may consider a presentation component such as a display device to be an I/O component. Also, processors have memory. We recognize that such is the nature of the art and reiterate that the diagram of FIG. 1 is merely illustrative of an exemplary master device that can be used in connection with one or more embodiments of the invention. Distinction is not made between such categories as "workstation," "server," "laptop," "hand-held device," etc., as all are contemplated within the scope of FIG. 1 and referenced to as a computer as a type of master device.

Master device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; removable media such as thumb drives, flash cards, etc., or any other tangible medium that can be used to encode desired information and be accessed by master device 100. Memory 112 includes computer-storage media in the form of volatile and/or non-volatile memory and includes any of the aforementioned media types.

Master device 100 includes one or more processors that read data from various entities such as memory 112 or I/O components 120. Presentation interfaces 116 present data indications to a user or other device and can be part of the device 100 or coupled to it. Exemplary presentation components include a display device, speaker, printing component, vibrating component, etc. I/O ports 118 allow master device 100 to be logically coupled to other devices including I/O components 120, some of which may be built-in. Illustrative components include a microphone, joystick, game pad, satellite dish, scanner, printer, wireless device, etc.

Figure 2A:
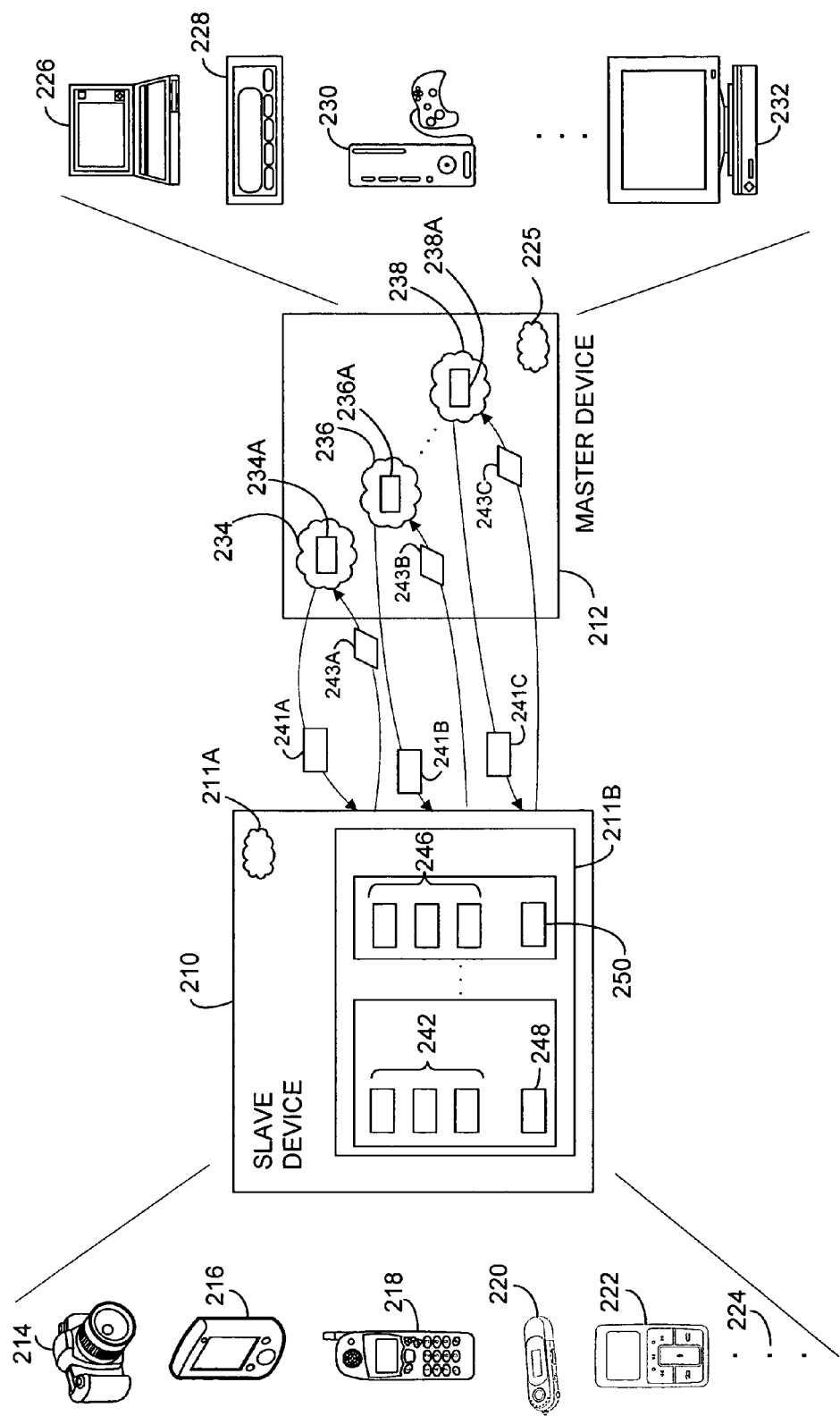
FIG. 2A is a block diagram that depicts an illustrative operating environment in accordance with an embodiment of the invention.

Turning now to FIG. 2A, a media device 210 is shown coupled to a master device 212. Media device 210 can read one or more machine-readable media, which are designated by reference numerals 211A and 211B. The media can be permanent or removable as previously described. In various embodiments, media device 210 may take the form of an electronic device, such as a digital camera 214, a PDA 216, a mobile phone 218, a portable music player 220, or a portable media player 222, or a variety of other devices not shown but indicated as contemplated by an ellipsis 224. Hereafter, media device 210 will be referred to as slave device 210 because in the context of the invention, it operates as a slave to master device 212. Master device 212 includes a set of machine-readable instructions 225 that are used to carry out various functional aspects of the invention. Master device 212 may take the form of a laptop computer 226, a radio head unit 228, a gaming console 230, some other form of computing device 232, or some other master device not shown but also represented by an ellipsis.

Master device 212 is shown as including multiple requesting applications designated by reference numerals 234, 236, and 238. This is not a peer-to-peer environment because slave device 210 is in a one-to-many relationship with requesting applications 234-238 on master device 212. Each of the master applications respectively includes a former maximum-sequence-value indicator (MSVI), which is respectively denoted by reference numerals 234A, 236A, and 238A. It will be explained in greater detail below, but a former maximum-sequence-value indicator is provided by slave device 210, and indicates the largest sequence-indicator of the device at the time it connects to master device 212. In some embodiments, two benchmark indicators are maintained: a former maximum-sequence-value indicator and a current maximum-sequence-value indicator, with the current maximum-sequence-value indicator taking on a current value from a newly coupled slave device 210, and the former maximum-sequence-value indicator storing the most recently replaced current maximum-sequence-value indicator. Again, this will be explained in greater detail below, with particular reference to FIG. 8.

Master device 212 initiates a request to slave device 210, which responds with information that is associated with a variety of objects on slave device 210. Slave device 210 depicts an embodiment that is more complicated than a less complicated embodiment. For example, slave device 210 depicts two separate sets of objects, a first set of objects 242 and a second set of objects 246. The set of objects 242 includes a corresponding maximum-sequence-value indicator 248. Similarly, object set 246 includes a corresponding maximum-sequence-value indicator 250. In this application, a variety of scenarios will be explained. And situations that do not require a more complicated explanation reference will generally be made to object set 242, having maximum-sequence-value indicator 248 that is used in connection with the respective sequence indicators to present information to an illustrative application such as application 234.

In an embodiment of the invention, an object property-based (OPB) protocol is used to facilitate the communication of information 243A, 243B, and 243C (such as object handles, other references, summary information, as well as the objects themselves), to master device 212, and if applicable, to respective requesting applications 234, 236, and 238 in response to respective information requests 241A, 241B, and 241C.

An OPB protocol, as used herein, is any protocol where all elements are presented as objects and are described by properties without having to retrieve the objects themselves. Content is exposed as objects and described by properties separate from the objects. An object-based protocol is one which provides access to a device and its contents using a combination of operations, responses, and (optionally) events. It uses these to describe its contents, which it represents in object form. Objects consist of an indicator (e.g., object handles, filenames, or object names) that is used to address objects in the protocol; a selection of metadata (e.g., properties) that describe the object, and which are retrievable without having to retrieve the binary payload itself; and one or more binary resources that contains the binary file that makes up the body of the object. There are objects that consist of only properties, and that have no binary component. These are referred to as abstract objects.

An illustrative such protocol includes the media transfer protocol (MTP), which is described more fully along with additional information for synchronizing data between electronic devices in 1) U.S. Patent Application having Ser. No. 10/836,260 filed on May 3, 2004, 2) U.S. application Ser. No. 10/839,299 filed on May 5, 2004, and 3) in a specification entitled "Media Transfer Protocol," which is available from MSDN.Microsoft.com. Each of these three documents are expressly incorporated by reference herein at least for the purposes described.

In an object-based protocol, objects are transferred as whole objects. That is, a request is made for an object. An advantage of such a scheme is that the requested file becomes agnostic to such things as file structure and operating system. Thus, files can be communicated across disparate operating systems and file systems. The file becomes a mutual being that is simply transferred from one device to another. Note, when reference herein is made to transferring a file, it is intended to include the concept of transferring a copy of a file rather than actually moving a file. This is well-contemplated within the art, and clarifying each distinction throughout the application would obscure the invention.

In one embodiment, master device 212 is in control, and slave device 210 will be trying to expose its content. In a peer-to-peer environment, the rolls of each can be reversed. That is, the master device can also be a slave device and the slave device can also be a master device. The invention is directed to solving problems associated in one-to-many environments, which presents issues disparate from those of peer-to-peer environments. Applicable operating environments of the invention include a car radio asking a media player for its contents, a gaming console requesting information of a device coupled to it, as well as a myriad of other examples both explicitly illustrated in FIG. 2A, as well as many other settings that will be contemplated by one of ordinary skill in the art upon reading this disclosure.

As mentioned, one (not the only) of the problems to be addressed by the invention is that of being able to rapidly expose new or changed content to a requesting application of an electronics device. There are many facets to the problem and a further goal is to be able to identify when in a sequence of changes a specific change occurred to a specific object at least in relation to a time the device last communicated with master device 212. Various methodologies will not work. For example, the clock on a digital camera is not a reliable indicator of when pictures were actually taken, provides no indication of when a change occurred with respect to last communicating to a requesting device, and may not even provide enough granularity to uniquely identify the sequence location of when a picture was taken. Unfortunately, many consumers simply do not program the clocks on their digital cameras.

Moreover, when people cross time zones, especially traveling westward, even ones who do set their clocks will end up setting their clocks backwards, which could lead to the false indication that a certain picture was taken before another when in fact it was taken after that other. The clock also does not provide any relative measurement with respect to when the device last communicated with master device 212.

Another illustrative shortcoming of using the clock as a potential sequence indicator is that it may not be precise enough. Some high-end cameras have the ability to take multiple pictures in rapid succession, including several pictures per second as a conservative estimate. If a clock keeps time only down to the seconds, then ten pictures taken with a high-shutter speed in rapid succession might receive the same time stamp across all of them.

Looking to existing art, such as and including peer-to-peer synchronization technologies will not be instructive in determining a solution to be able to universally identify a relational sequence attributable to objects on an electronics device such as slave device 210. Such legacy logic actually confounded the problem because old thoughts of the way things had been done in a different paradigm were not helpful in being applied to solve a problem in the operating environment of the invention, including a one-to-many relationship between an object set 242 and many initiating applications 234, 236, and 238. Again, one of the problems was being able to rapidly identify changed objects (including objects whose properties have changed) as well as newly created objects without having to completely mirror the contents of the slave device 210 on master device 212 (and perhaps many instances thereof for as many master applications as are present) and without having to enumerate the complete contents of an electronics device.

Figure 2B:
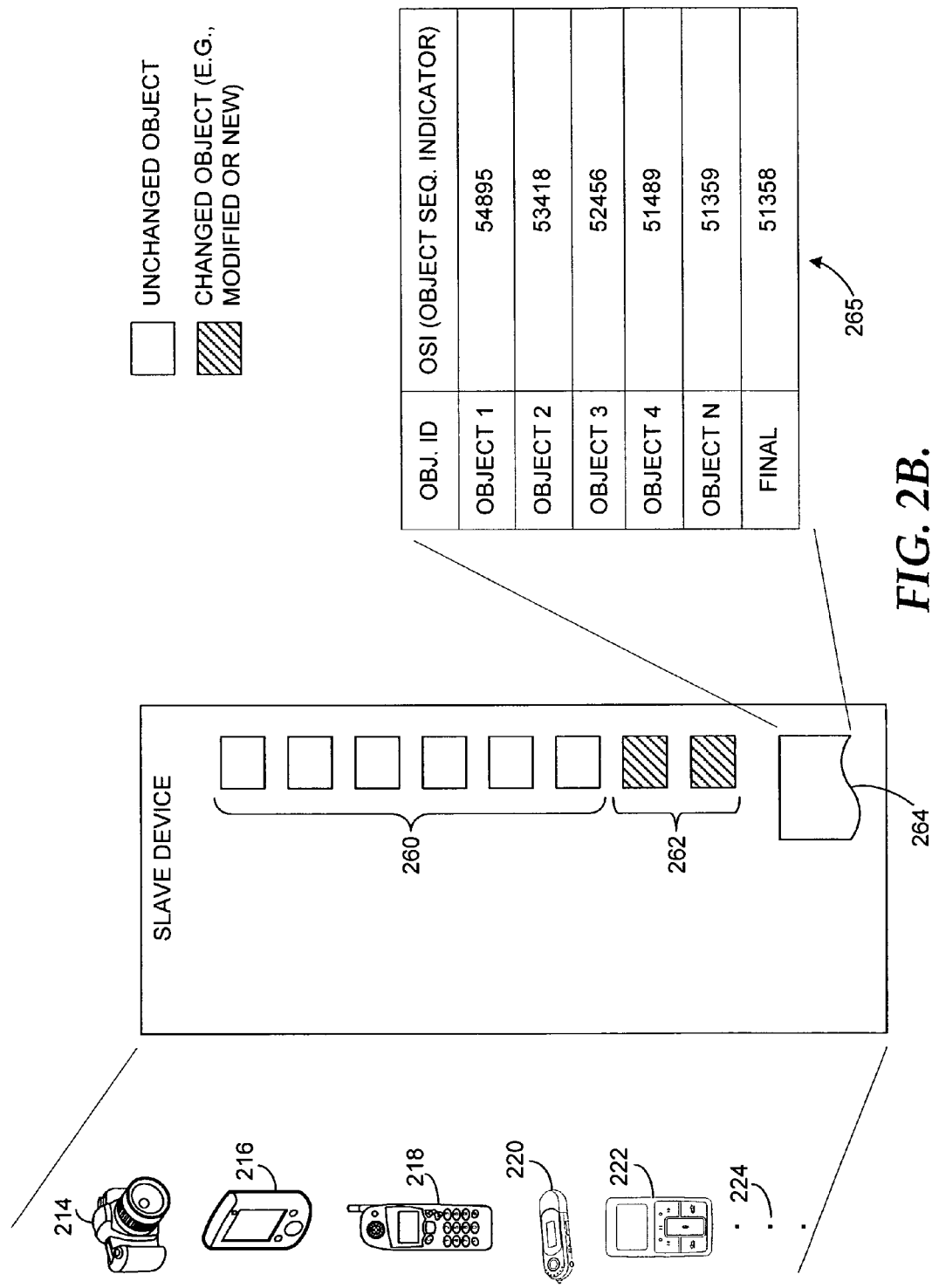
FIG. 2B illustrates aspects of data objects stored on a slave device and shows a deletion list that is maintained according to an embodiment of the invention.

FIG. 2B illustrates how some objects of slave device 210 can remain unchanged while others are changed (modified or new). For example, the objects represented by reference number 260 are unchanged objects; that is, unchanged with respect to a time that slave device 210 last communicated with master device 212. In some embodiments, this designation can be user controlled or device controlled so that merely connecting slave device 210 to master device 212 does not serve as a communicating event.

Changed objects are indicated by reference numeral 262. As used herein, a "changed" object is one that was either modified or includes newly created objects. A deleted-files list 264 is also shown, which provides a way to keep track of objects that were deleted from slave device 210. This list can be set to be a preset length so that it does not consume more space than is desirable. For example, it can be configured to keep track of the last N objects. This list can simply be requested by master device 212 to identify which objects have been deleted. In one embodiment, the list takes the form of a 2×N array 265 that is composed of identifiers that identify deleted objects as well as a corresponding sequence indicator that indicates when the objects were deleted at least in relation to slave device's maximum-sequence-value indicator 248 or 250, but also in relation to when changes were made to existing objects or when new objects were created.

In one embodiment of the invention, identifying modified objects or newly created objects 262 is accomplished by providing an extra property on each object that in one embodiment receives an object sequence indicator (OSI) that can be used to identify when a change occurred to an object in relation to changes to other objects, and in some embodiments just in relation to at least a benchmark indicator, which can be a maximum-sequence-value indicator. The sequence indicator can be monotonically increasing or monotonically decreasing. In both scenarios, a subsequent value is at least as extreme as all previous values. Monotonic indicators are either nonincreasing or nondecreasing. Nondecreasing values never decrease, but contiguous values may be the same. Similarly, nonincreasing values never decrease, but contiguous values may be the same. In one embodiment, a sequence-indicator is nondecreasing. That is, the values perpetually increase, never oscillate. But it is also contemplated within the scope for the claims below that an inordinately large number could be started with and decremented as time continues. Thus, in one embodiment, the invention takes the form of an embodied data structure, an illustrative one of which is referenced by numeral 300 in FIG. 3A.

Figure 3A:
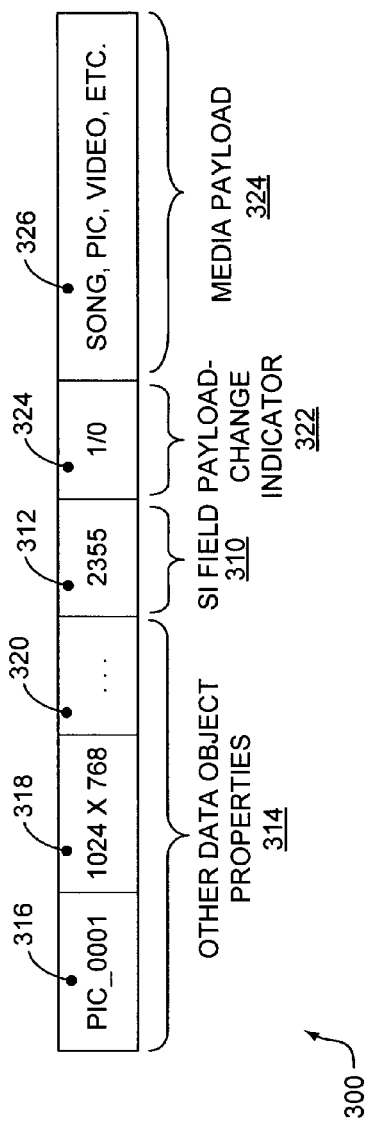
FIGS. 3A and 3B illustrate two representations of almost unlimited variations of a data structure that include a reserved location for receiving a sequence-identifying field in accordance with an embodiment of the invention.

FIG. 3A depicts an illustrative representation of a data structure that can be used in connection with one embodiment of the invention. This data structure includes a new field, a sequence-identification field 310 that includes a sequence-indicator 312 as one of its properties. Data structure 300 also includes a set of other data object properties referenced by the numeral 314, which illustratively include a file name property 316, a resolution property (as the case may be) 318, and a variety of other properties that are illustratively represented by numeral 320. A payload-change indicator field 322 is also provided by the invention to receive a corresponding property 324 that indicates whether a media payload 326 has changed itself, as compared to one of its corresponding properties. For example, payload-change indicator 322 may be a "1" if the actual content of the media payload has changed, whereas it may be a "0" if a property associated with a payload changed but not the payload itself.

Figure 3B:
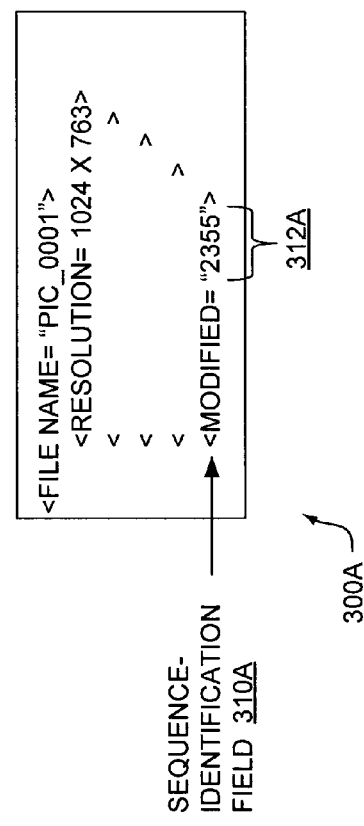

As will be discussed below, when a data object changes or is newly created, its sequence-identification field 310 is populated with a sequence-indicator 312. A device may store hundreds, thousands, or even more data objects, each with a corresponding sequence-identification field 310 and sequence-indicator 312. These collections of sequence-indicators will be used in connection with a maximum-sequence-value indicator typically associated with a device, but also can be associated with a respective set of data objects, so that a sequence can be identified of changes that occurred to various objects in relation to maximum-sequence-value indicator and/or in relation to each other as the case may be. FIG. 3B merely depicts an alternative way of expressing data structure 300, which is referenced by numeral 300A. It also includes a sequence-identification field 310A as well as a corresponding sequence-indicator 312A. One of ordinary skill in the art will appreciate that there are myriad ways of depicting the data structure of FIG. 3A, which is not meant to be limiting in nature but is meant to merely illustrate the embodied concept of associating an extra property to an object such that the property indicates when in a sequence of changes the change occurred to the instant object.

Thus, in one embodiment, the invention leverages a monotonically-increasing property in an object-property-based protocol to identify a sequence at which changes were made, and further leveraging a benchmark indicator associated with a set of objects and/or with a device itself to identify the position in that sequence where the change occurred. This provides the ability to retrieve a list of objects that have been created or that have been changed after some event, such as after last communicating with master device 212.

One of the many advantages of the invention is it offers a high degree of flexibility with respect to the implementation details of how data is stored on slave device 210. As long as the objects are stored in such a way that each one is accompanied with a sequence-identification field such as field 310A, a field that master device 212 knows to look for, much latitude can be given to a developer. The data (e.g., 242, 246, 248, and 250) can be stored in a variety of ways, but it is presented to master device 212 in a standard form. The way that device 210 keeps track of changes can vary across devices and can be left up to the device manufacturer. This is actually a benefit of the invention. By establishing a common platform for expressing the tracking of such changes irrespective of how the device is storing it internally, a one-to-one relationship between device type and requesting application is not necessary, and proprietary solutions are not required. Thus, it is important to appreciate that the previously referred to illustrative data structures of FIGS. 3A and 3B are not flippantly referred to as illustrative. They are very much illustrative only. A variety of storage schemes can be employed, and only a couple are provided for explanatory purposes only.

Figure 4:
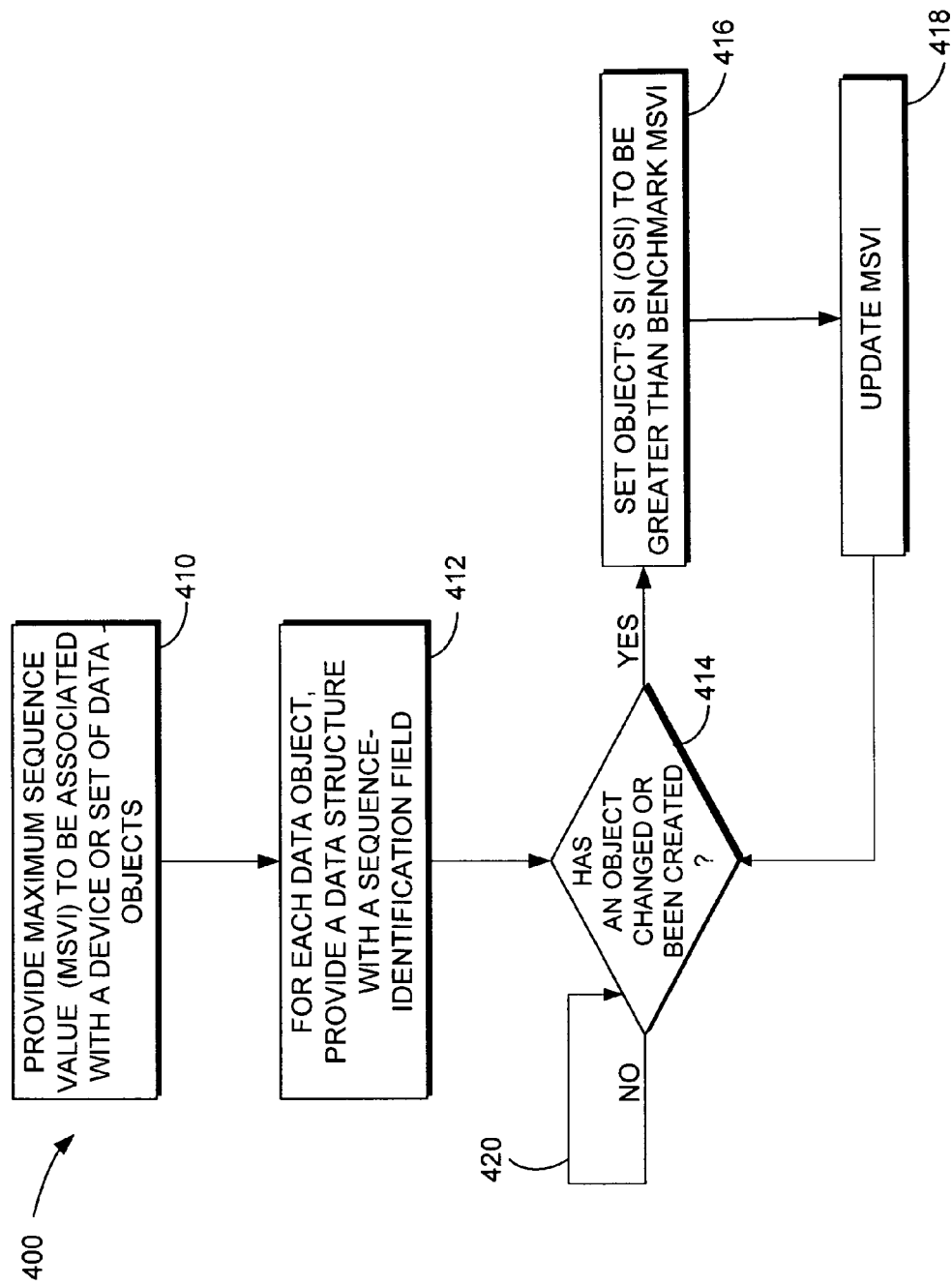
FIG. 4 depicts an illustrative flow of operations of a slave device in accordance with an embodiment of the invention.

Additional details of merely one way that slave device 210 may store its data is provided with reference first to FIG. 4. The method 400 of FIG. 4 illustrates that a step 410 on maximum-sequence-value indicator is provided that is to be associated with a device or set of data objects. Thus, in one embodiment the maximum-sequence-value indicator would correspond to reference numeral 248 on FIG. 2A, and the set of data objects would correspond to reference numeral 242. The maximum-sequence-value indicator is a benchmark indicator that has a certain value. The value of the maximum-sequence-value indicator may change based on various circumstances. For instance, in one embodiment it is updated after there is a communication with master device 212. In other embodiments, it is updated after an object's sequence indicator is updated. In still other embodiments, it can be periodically updated automatically. Explanation will first be provided with respect to the embodiment where the maximum-sequence-value indicator is updated every time a change or set of changes occurs to objects on slave device 210.

Returning to FIG. 4, at a step 412, a data structure that includes a sequence-identification field is provided for each data object 242. Thus, a data structure of the format shown in FIG. 3A may be used. At a step 414, a determination is made as to whether any object 242 has been changed or newly created. The invention can track changes to existing objects as well as track when new objects are created. A change to an object includes a change to a property associated with that object.

If a change does occur to an object, then processing continues to a step 416 where the corresponding object's sequence-indicator 312 is set to be greater than maximum-sequence-value indicator 248. Those skilled in the art will appreciate ways to accomplish similar functionality, which is contemplated within the scope of the claims below. The illustrative example of starting with a very large number and having all numbers decrease with respect to the initial number has already been described. In this embodiment, the maximum-sequence-value indicator is updated at a step 418 before processing reverts to a state where slave device 210 waits (420) until an object changes or has been created.

Figure 5:
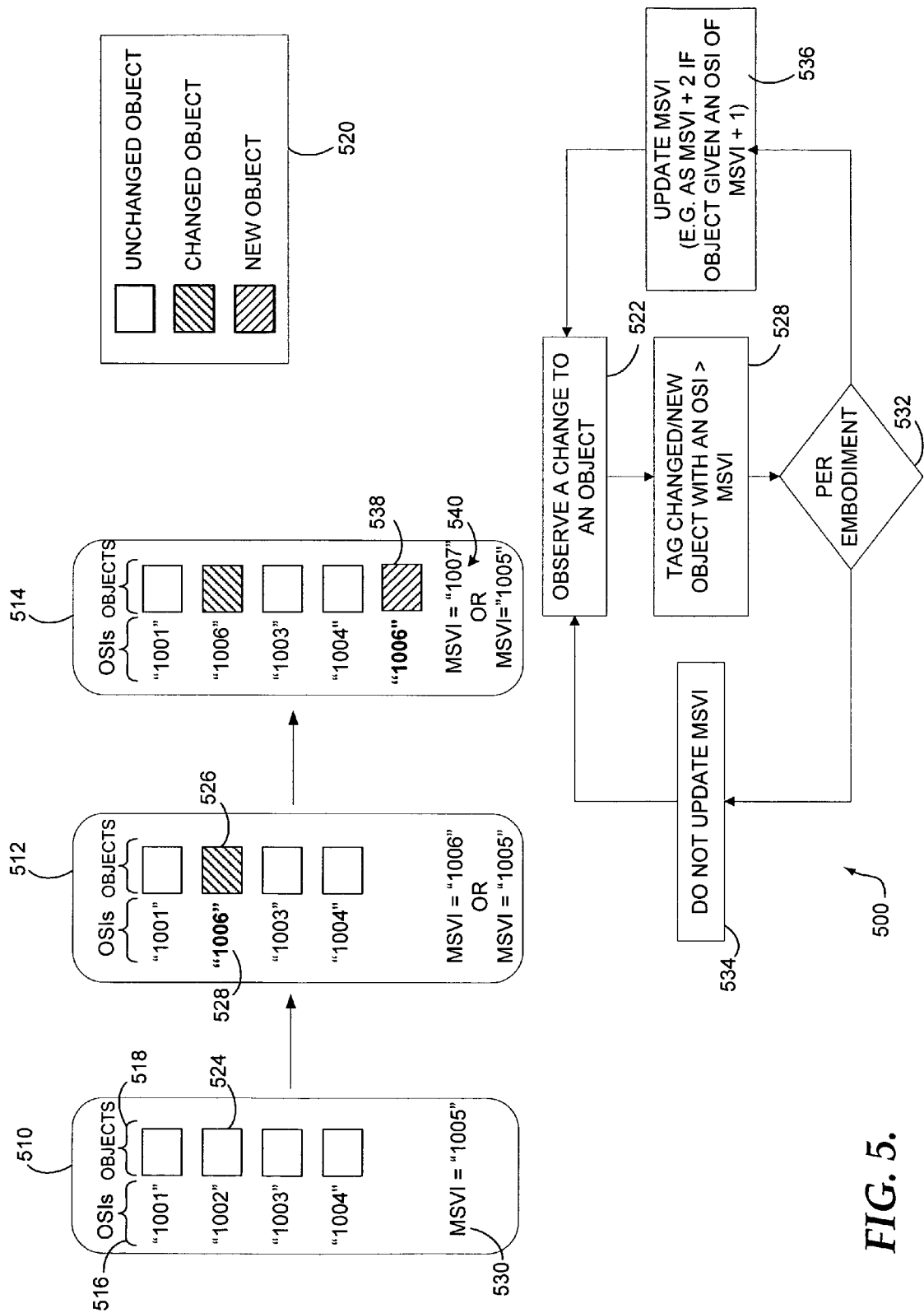
FIG. 5 depicts a flow diagram that is referenced in connection with a state diagram tracing illustrative operations of a slave device in accordance with an embodiment of the invention.

A more detailed explanation will now be provided with respect to an embodiment of the invention with reference to FIG. 5. FIG. 5 depicts a flow diagram as well as three states of a set of data objects and their corresponding object sequence indicators (OSIs) that are referenced by numerals 510, 512, and 514. States 510, 512, and 514 represent different states of objects on slave device 210. In the first state 510, a set of object sequence indicators is associated with a corresponding set of objects 518.

The object sequence indicators 516 have values of "1001," "1002," "1003," and "1004." As can be seen by legend 520, each of the objects is in an unchanged state. A step 522 indicates that a change has occurred to one of the objects in set 518. In this example, assume an object 524 changes state, which is referenced by numeral 526. Flow diagram 500 illustrates that at a step 528 the transitioning from an unchanged state to a changed state is denoted by updating the object's corresponding object sequence indicator, which is indicated by reference numeral 528. Here, object 524's object sequence indicator is updated from "1002" to "1006." The figure "1006" was selected by referencing the then-current maximum-sequence-value indicator 530 (having a value of "1005") and setting object 526's object sequence indicator to be a value greater than that of maximum-sequence-value indicator 530. A decision step is shown by reference numeral 532 indicating that the maximum-sequence-value indicator can either be updated or not updated based on various embodiments of the invention. For example, in a first embodiment the maximum-sequence-value indicator is not updated, and processing would continue to step 534, which is a placeholder step indicating that the maximum-sequence-value indicator value of "1005" continues after the updating of object 526's corresponding object sequence indicator. This can be the case because the last time slave device 210 communicated with master device 212, it also communicated its maximum-sequence-value indicator 530 of "1005" to master device 212.

Thus, in a case where master device 212 would wish to discover all changes subsequent to the last time it communicated with slave device 210, it would be able to do so as long as all of the changes that occurred after communicating with master device 212 were denoted with a sequence-indicator greater than the former maximum-sequence-value indicator 530. This explanation is included to show that such a paradigm is possible based on the desires of an implementer.

But in another embodiment, the maximum-sequence-value indicator is updated automatically or incident to the updating of an object's object sequence indicator. In such a case, processing would continue to a step 536, which shows one embodiment where a maximum-sequence-value indicator is updated, say, for example, by two, wherein an object's object sequence indicator was updated to be only one greater than the initial maximum-sequence-value indicator 530. Again, state 514 shows a new object 538 that was created as possibly having object sequence indicator of 1006, which is even the same value as that of object 526. But in another embodiment, the object sequence indicator of object 538 would take on a value greater than that of "1006." In this embodiment, the maximum-sequence-value indicator would be incremented still one further, taking on a value of "1007," as indicated by reference numeral 540. In the case where the maximum-sequence-value indicator is not updated after each object's object sequence indicator is updated, it would be updated when slave device 210 is coupled to master device 212 and given a value greater than any of the object sequence indicators 516.

Turning now to FIG. 6, an illustrative method for slave device 210 to expose information about a set of objects 242 to master device 212 is provided referenced generally by the numeral 600. At a step 610, slave device 210 can receive multiple object-information requests (such as those indicated by numerals 241A, 241B, and 241C) from multiple requesting applications, such as 234, 236, and 238. This is another advantage of the invention, being able to provide such information as sequence information associated with changes of various objects to multiple applications rather than only to a single application.

When slave device 210 is coupled to master device 212, many applications may attempt to communicate with slave device 210. For example, if slave device 210 takes the form of an audio player 220, then various audio-playing applications created by various vendors will all sense a connection of slave device 210 to master device 212 and attempt to interrogate the device. Requests such as those of 241A, B, C will be sent to slave device 210 for it to perhaps list all new content, or list only content that meets certain criteria.

To meet these requests, slave device 210 will determine an appropriate former maximum-sequence-value indicator at a step 612. For example, if slave device 210 received a request from application 234, then it will determine that the correct maximum-sequence-value indicator associated with application 234 is the maximum-sequence-value indicator indicated by numeral 234A. Similarly, if the request 241B came from application 236, then application 236 will provide logic so that slave device 210 will know that maximum-sequence-value indicator 236A is the correct maximum-sequence-value indicator.

At a step 614, slave device 210 uses the maximum-sequence-value indicator of the requesting application along with the sequence-indicators of a set of objects (such as that of 242 or 246) to satisfy each request. For example, if requesting application 238 sent request 241C to slave device 210 to list all those objects that are new in set 246, then slave device 210 would compare the sequence-identification fields 310 of each of the objects 246 and pass back information 243C associated with those objects whose sequence indicators are greater than that of 238A. Application 238 may be a photography application with a maximum-sequence-value indicator of "973." If slave device 210 were a camera, and had several thousand pictures that made up a set indicated by reference numeral 246, but only two of the images had object sequence indicators greater than "973," then information associated only with those two pictures would be sent to requesting application 238 on device 212.

Similarly, if application 238 requested an indication of all objects that it deleted prior to or after some event, slave device 210 could reference its deletion log 264 to satisfy such request. In another example, an application may request to be notified only whether an object's actual binary file or media payload 326 has changed. In such a case, slave device 210 could reference payload-change indicator 322 of various objects to quickly indicate which object's media payload's have changed.

As previously mentioned, lower-level details that relate to aspects of storing information on slave device 210 can vary, and so can the lower-level details of how information is stored and even presented to master device 212. For example, in one embodiment, each time a change is made to an object, and that object's corresponding object sequence indicator is updated, that object's indicator 316 may be added to a log, which serves as a quick reference to satisfy the informational requests of a requesting application. In other embodiments, queries can be performed on the data incident to receiving a request. In this embodiment, if a requesting application requests, for example, all data objects having a sequence indicator greater than some number, then the metadata 314, 310, 322 can be rapidly queried based on the criteria provided. What is more important is that a data structure be provided in connection with an object-based protocol so that a sequence-identification field 310 is associated with an object and populated incident to a change at that object so that the timing of such object can be determined at least with respect to a benchmark indicator, but in other embodiments with respect to the changes made to other objects.

Turning now to FIG. 7, a flow 700 is provided as an exemplary way that a master device can perform a method for receiving information about objects stored on slave device 210. At a step 710, master device 212 receives an indication that slave device 210 is coupled to master device 212. At a step 712, master device 212 retrieves from storage a former maximum-sequence-value indicator, which may be application specific, that is associated with a certain application. Thus if application 234 is a relevant application, then it would receive maximum-sequence-value indicator 234A. Similarly, application 236 would retrieve maximum-sequence-value indicator 236A. Same with application 238.

As previously mentioned, master device 212, or more particularly, an application such as application 234, may refer to two benchmark indicators: a former benchmark indicator and a current benchmark indicator. In such a scheme, the former maximum-sequence-value indicator will be used as a benchmark with which to test the object sequence indicators of objects on slave device 210, while a current maximum-sequence-value indicator will receive the current value of the device's maximum-sequence-value indicator. This aspect will be explained in greater detail with respect to FIG. 8.

At a step 714, master device 212 will receive information such as information 243A from slave device 210. The information will be related to certain data objects of set 242, for example, based on the objects sequence indicators and based on the retrieved maximum-sequence-value indicator. Again, perhaps requesting application 234 simply requests all new pictures for example. In that case, requesting application 234 would pass slave device 210 its former maximum-sequence-value indicator 234A, which slave device 210 would use to compare the object sequence indicators of an object set 242 and return information 243A associated with only those objects. Information 234A may include handles to objects 242 or subsets thereof, or other references to a portion of those objects or metadata associated with the objects. Whatever master device 212 requested, and is retrievable by slave device 210, is included within the scope of information 243A.

Having received such information allows master device 212 at a step 716 to perform whatever operations are desired in connection with the determined objects. Illustrative operations may include acquisition, placement, and change-detection operations. Master device 212 may wish to receive copies of the objects that are indicated in information 243A. Master device 212 may wish to delete a set of objects. A myriad of examples could be included here and it is not practical to do so but one of ordinary skill in the art would readily appreciate that a wide array of possibilities apply when an application 234 is able to receive information 234A associated with specific objects of object set 242 based on sequence criteria provided where data 300 exists to satisfy that criteria. At a step 718, master device 212 receives slave devices' current maximum-sequence-value indicator 248, which will now be stored as a former maximum-sequence-value indicator. Thus at a step 720, the former maximum-sequence-value indicator is updated based on the devices' current maximum-sequence-value indicator.

Figure 8A:
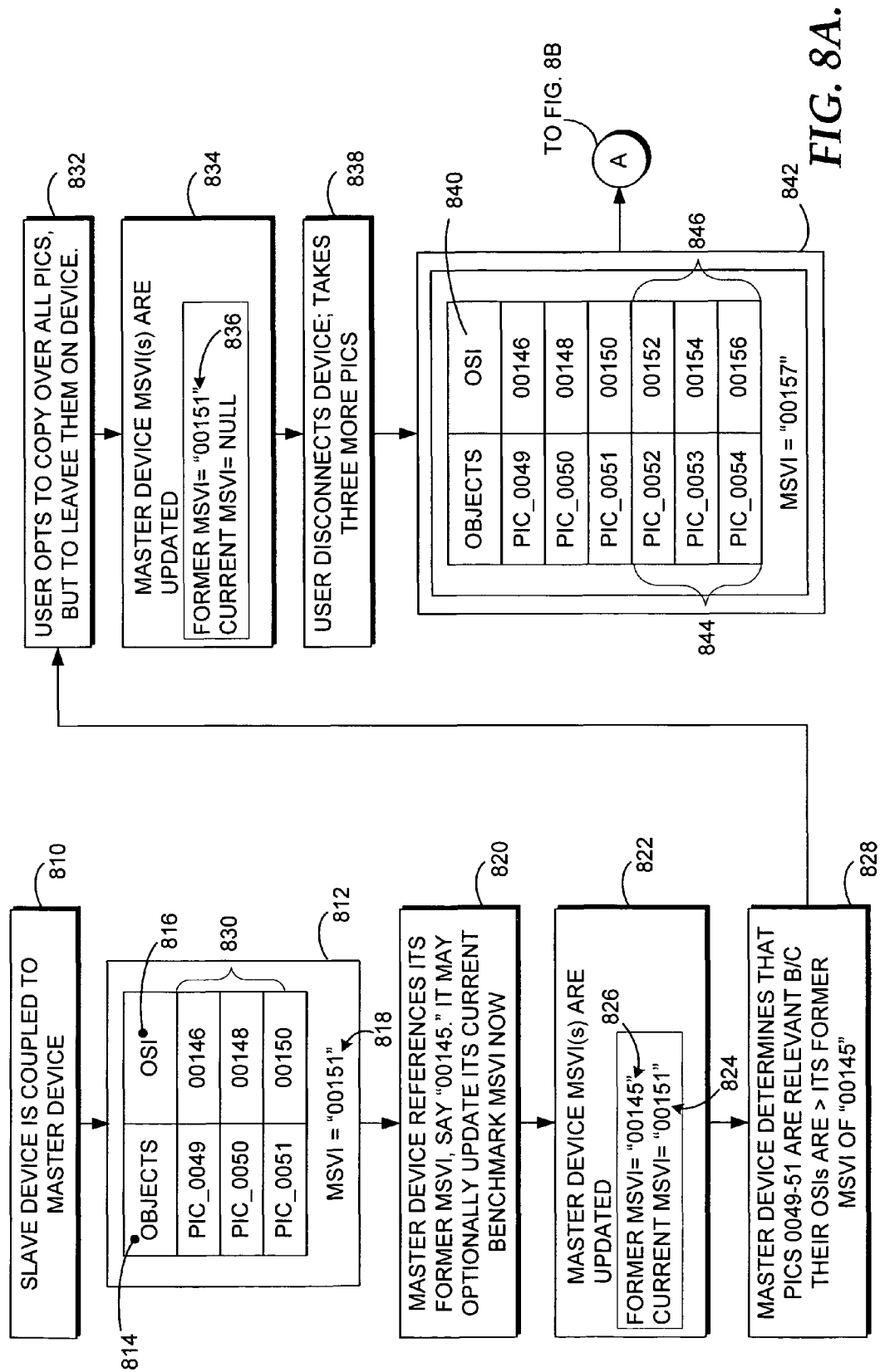
FIGS. 8A and 8B provide a more detailed overview of an exemplary process carried out by one embodiment of the invention.
Figure 8B:
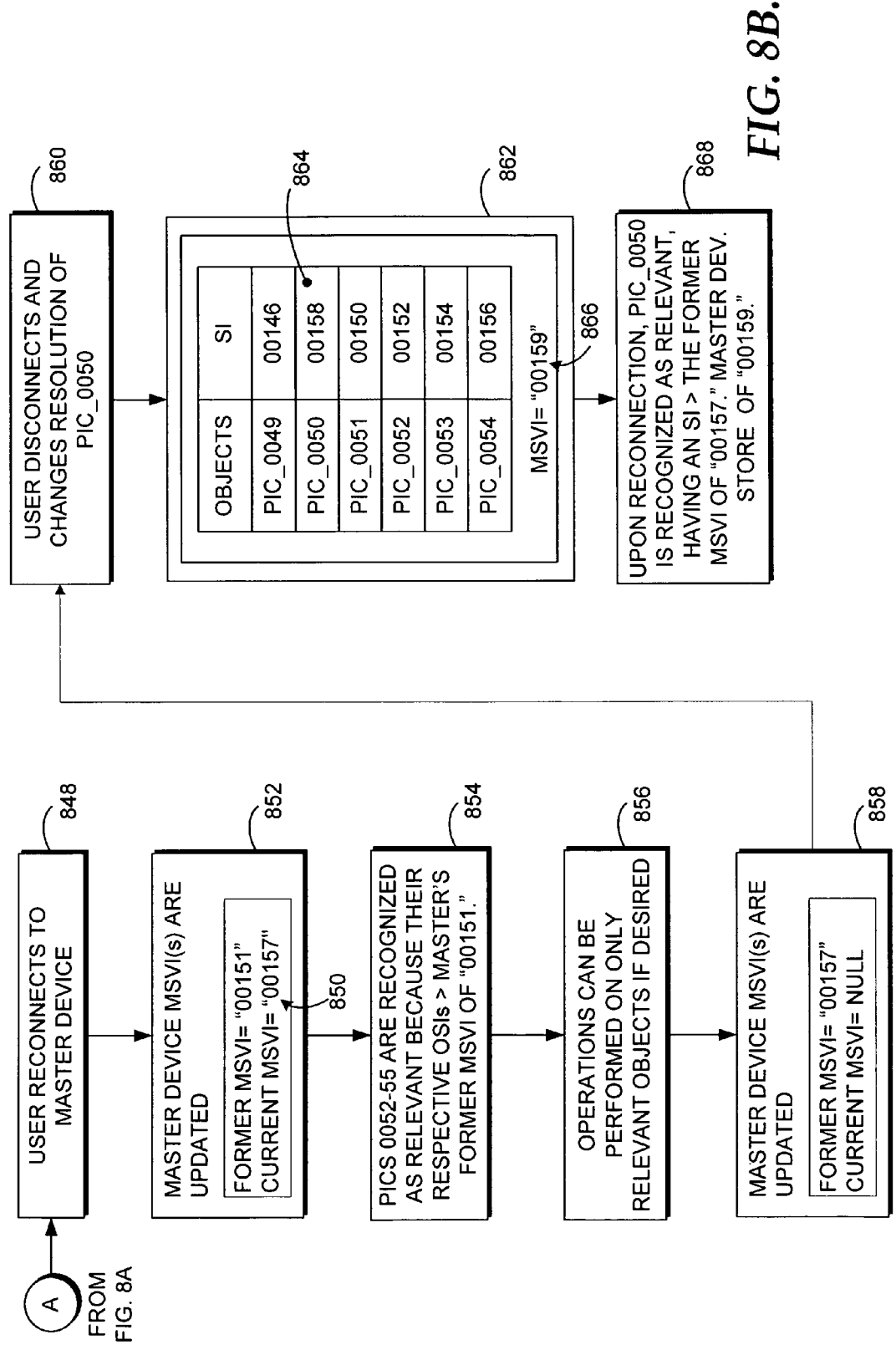

A final illustrative example will now be provided with reference to FIGS. 8A and 8B that encompasses a variety of aspects of the invention. For purposes of this example, the requesting application will be assumed to be 234 and the applicable dataset will be data 242, which is associated with maximum-sequence-value indicator 248. Specific examples are also provided within FIG. 8A itself, and those will be referenced with new numerals that appear in FIGS. 8A and/or 8B. Turning first to FIG. 8A, at a step 810, slave device 210 is coupled to master device 212. State 812 represents an illustrative state of objects 814 having respective object sequence indicators' 816. As shown, objects 814 include three pictures, which each have a corresponding object sequence indicator, and further includes a device maximum-sequence-value indicator 818 of "00151." At a step 820, master device 212 references its former maximum-sequence-value indicator (such as that represented by numeral 248), which has an illustrative value say of "00145." In some embodiments the one or more device maximum-sequence-value indicators may be updated at this point. In other embodiments a master device may only track a single benchmark indicator. In such an embodiment, a master device's single maximum-sequence-value indicator would be updated after a communications session with slave device 210. But in this embodiment, maximum-sequence-value indicator 818 of slave device 210 is preserved in a current maximum-sequence-value indicator field 824. As previously mentioned, the device's 234 former maximum-sequence-value indicator value 826 is "00145." At a step 828, master device 212 determines that pictures 0049 through 0051 are relevant because their respective object sequence indicators 830 are greater than the master devices former maximum-sequence-value indicator of "00145."

At a step 832, a user opts to copy over all of the pictures but to also leave them on the device. The pictures are also copied to master device 212 at step 832. This is one illustrative point at step 834 where one or more maximum-sequence-value indicator(s) of master device 212 can be updated. As shown, the former maximum-sequence-value indicator field 836 now has a value of "00151," which used to be the current maximum-sequence-value indicator and also is the benchmark indicator 248 of slave device 210. At a step 838, a user disconnects the device and takes three more pictures. The status of the objects and their corresponding object sequence indicators 840 is represented by state 842. As can be seen, the new pictures 844 have corresponding object sequence indicators 846 that are greater than the device's previous maximum-sequence-value indicator 818. In this case, the new pictures have object sequence indicators of "00152," "00154," and "00156." As also shown by state 842, the device maximum-sequence-value indicator of slave device 210 has been updated to a value of "00157."

Continuing on to FIG. 8B, assume that a user reconnects to master device 212 at a step 848. In one embodiment, slave device's maximum-sequence-value indicator is preserved as indicated by reference numeral 850 in state 852. The former maximum-sequence-value indicator associated with the respective requesting application remains as "00151." At a step 854, pictures 844 denoted as having the number 0052 through 0054 are recognized as relevant because their respective object sequence indicators 846 are greater than the master device's former maximum-sequence-value indicator of "00151." At a step 856, operations can be performed optionally on only the relevant objects if that's desired. At a step 858, the former maximum-sequence-value indicator of master device 212 is updated to that of slave device 210, which is "00157." At a step 860, assume the user disconnects but then changes the resolution of pic_0050. As indicated by state 862, the object sequence indicator of pic_0050 864 is updated to have a value greater than the device's current benchmark indicator 850, which had a value of "00157." The maximum-sequence-value indicator of slave device 210 is updated to a value of "00159" as indicated by reference numeral 866. Step 868 indicates that upon reconnection, pic_0050 will be recognized as relevant because it has a corresponding object sequence indicator that is greater than the former maximum-sequence-value indicator of "00156." The master device will store slave device's maximum-sequence-value indicator of "00159."

Reference has been made herein to performing such analyses as determining what objects have values greater than some benchmark value. Of course, one may also perform an analysis based on what values are greater than or equal to the value, or some other variation. But in all cases, some benchmark value is being used in connection with a set of sequence-identifying values. Precisely how those values are used may vary, but utilizing them is contemplated within the scope of the claims below. In some embodiments, the maximum-sequence-value indicator may increase of its own accord, automatically and independently of changes.

Some of the examples above were provided within the context of a computing device being the master device 212. But as previously briefly mentioned, the master device is not limited to being a computer. Embodiments of the invention are applicable to any environment where changes are tagged by a sequence-indicator in a standard format, and these sequence-indicators are compared to a benchmark indicator to determine relevant objects.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. For example, current and former values of the maximum-sequence-value indicator may be maintained on the master device, slave device, or combinations thereof. And the maximum-sequence-value indicator can be used to determine the maximum object sequence identifier (or range thereof, e.g., "the maximum object sequence identifier is less than X"), but does not itself per se need to be greater than all object sequence identifiers. What is more important is that it is utilized to determine a next correct object sequence identifier.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of utilizing an object-based protocol for communicating between a master device and a slave device, the method comprising:
   facilitating a communications link with said slave device, said slave device including,
   (1) one or more objects on said slave device that are respectively associated with a set of corresponding object sequence indicators, wherein the object sequence indicator is a value within a set of values that for any two values, a later value is at least as extreme as a preceding value; and
   (2) a current maximum-sequence-value indicator that indicates the largest object sequence indicator on said slave device;
   communicating a request initiated by a requesting application on the master device for information about objects on the slave device based on a former maximum-sequence-value indicator corresponding to the requesting application, which indicates when the slave device formerly communicated with the master device, wherein said former maximum-sequence-value indicator is provided by said master device in association with the request;
   receiving information that satisfies the request, wherein the received information is communicated to the master device from the slave device, wherein the received information is related to objects that satisfy said request initiated by the requesting application, wherein the received information is determined based on utilizing the former maximum-sequence-value indicator and the object sequence indicators, wherein utilizing the former maximum-sequence-value indicator and the object sequence indicators includes determining a first set of objects whose corresponding object sequence indicator exceeds said former maximum-sequence-value indicator, and further wherein the received information is communicated to the master device based on the request initiated by the requesting application on the master device, and further wherein the received information comprises one or more of:
   (1) references to said first set of objects communicated to said master device, and
   (2) said first set of objects communicated to said master device; and
   updating the former maximum-sequence-value indicator corresponding to the requesting application with the current maximum-sequence-value indicator, wherein updating the former maximum-sequence-value indicator comprises receiving from the slave device its current maximum-sequence-value indicator and storing it as said former maximum-sequence-value indicator for the requesting application.

2. The method of claim 1, wherein said master device includes a computing device and wherein said slave device includes a media-playing device.

3. The method of claim 2, wherein the media-playing device is a device that plays one or more of audio files, video files, or data files.

4. The method of claim 1, further comprising identifying a set of objects that were deleted from said master device.

5. One or more computer storage devices storing machine-readable media having embodied thereon a set of one or more data objects, a data structure respectively associated with each data object, and a maximum-sequence-value indicator associated with the set of one or more data objects to assist in presenting information related to the data object(s), the data structure comprising:
   a first set of properties associated with a first data object; and
   a sequence-identification field that also corresponds to the first object and that is populated with:
   (1) an object sequence indicator that indicates when a change occurred to the first data object in relation to the maximum-sequence-value indicator, the change including one or more of a creation of a new data object and a change to a property associated with the object; and (2) indications of deleted objects that include corresponding object sequence indicators that indicate when an object was deleted relative at least to the maximum-sequence-value indicator;

wherein the maximum-sequence-value indicator is updated to be at least as extreme as any of the object sequence indicators of the data structure(s), wherein a method, utilizing an object-based protocol for communicating between a master device and a slave device, for identifying one or more of newly created objects, modified objects, or deleted objects of said slave device comprises utilizing said machine-readable media, wherein said method comprises:

facilitating a communications link with said slave device, said slave device including,
(1) one or more objects on said slave device that are respectively associated with a set of corresponding object sequence indicators, wherein the object sequence indicator is a value within a set of values that for any two values, a later value is at least as extreme as a preceding value; and
(2) a current maximum-sequence-value indicator that indicates the largest object sequence indicator on said slave device;

communicating a request initiated by a requesting application on the master device for information about objects on the slave device based on a former maximum-sequence-value indicator corresponding to the requesting application, which indicates when the slave device formerly communicated with the master device, wherein said former maximum-sequence-value indicator is provided by said master device in association with the request;

receiving information that satisfies the request, wherein the received information is communicated to the master device from the slave device, wherein the received information is related to objects that satisfy said request initiated by the requesting application, wherein the received information is determined based on utilizing the former maximum-sequence-value indicator and the object sequence indicators, wherein utilizing the former maximum-sequence-value indicator and the object sequence indicators includes determining a first set of objects whose corresponding object sequence indicator exceeds said former maximum-sequence-value indicator, and further wherein the received information is communicated to the master device based on the request initiated by the requesting application on the master device, and further wherein the received information comprises one or more of:
(1) references to said first set of objects communicated to said master device, and
(2) said first set of objects communicated to said master device; and updating the former maximum-sequence-value indicator corresponding to the requesting application with the current maximum-sequence-value indicator, wherein updating the former maximum-sequence-value indicator comprises receiving from the slave device its current maximum-sequence-value indicator and storing it as said former maximum-sequence-value indicator for the requesting application.

6. One or more machine-readable computer storage devices having a set of machine-readable instructions embodied thereon that when processed by a slave device cause it to perform a method of exposing information about a set of data objects to one or more requesting applications running on a master device, the method comprising:

receiving, by a slave device, a plurality of independent object-information requests from the requesting applications on the master device, each of the object-information requests being for information about at least a portion of the data objects in the set of data objects on the salve device, wherein each of the object-information requests are based on a former maximum-sequence-value indicator corresponding to the requesting applications, wherein the former-maximum-sequence-value indicator indicates when the slave device formerly communicated with the master device and is provided by said master device in associated with the received requests;

identifying from each request a respective former maximum-sequence-value indicator that indicates when the slave device last communicated with a respective requesting application;

utilizing previously stored object sequence indicators in connection with the respective former maximum-sequence-value indicator to satisfy each of the plurality of object-information requests, such that each requesting application receives information about only those data objects whose corresponding object sequence indicator satisfies criteria with respect to the maximum-sequence-value indicator, wherein satisfying criteria with respect to the maximum-sequence-value indicator comprises determining a plurality of data objects whose corresponding object sequence indicators exceed the corresponding former maximum-sequence-value indicator identified from each request;

communicating the satisfied plurality of object-information requests to the master device, wherein the communicated information comprises:
(1) references to the data objects whose corresponding object sequence indicator satisfies criteria with respect to the maximum-sequence-value indicator, and
(2) the data objects whose corresponding object sequence indicator satisfies criteria with respect to the maximum-sequence-value indicator; and providing an updated former maximum-sequence-value indicator corresponding to the requesting application for updating the current maximum-sequence-value indicator for each of the data objects communicated to the master device.

7. The computer storage devices of claim 6, wherein the object sequence indicator is a value in a set of monotonically increasing values.

8. The computer storage devices of claim 7, wherein the object sequence indicator indicates when the change occurred in relation to changes of other data objects.

9. The computer storage devices of claim 7, wherein the object sequence indicator indicates when the change occurred in relation to changes of other data objects even when a time stamp would not indicate a unique sequence position.

10. The computer storage devices of claim 6, wherein the machine-readable instructions further include instructions to identify deleted objects as well as when in relation to the former maximum-sequence-value indicator the deleted objects were deleted.

11. The computer storage devices of claim 6, wherein the machine-readable instructions further include instructions to communicate one or more references to at least a portion of the data objects from the slave device to the master device.

* * * * *